(12) United States Patent
Gasperino et al.

(10) Patent No.: US 11,479,379 B1
(45) Date of Patent: Oct. 25, 2022

(54) PACKAGING RECOMMENDATION SYSTEM

(71) Applicant: Amazon Technologies, Inc., Seattle, WA (US)

(72) Inventors: David Joseph Gasperino, Lake Forest Park, WA (US); Renan Garcia, Austin, TX (US); Rajat Singhal, Redmond, WA (US); Kayla Fenton, Seattle, WA (US); Tyler Manning Blackmore, Quakertown, PA (US); Kimberly Sue Houchens, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 312 days.

(21) Appl. No.: 16/867,108

(22) Filed: May 5, 2020

(51) Int. Cl.
  *B65B 59/00* (2006.01)
  *G06Q 10/08* (2012.01)
  *G06N 20/00* (2019.01)
  *B65G 1/137* (2006.01)

(52) U.S. Cl.
  CPC .......... *B65B 59/001* (2019.05); *B65G 1/1373* (2013.01); *G06N 20/00* (2019.01); *G06Q 10/087* (2013.01)

(58) Field of Classification Search
  CPC .... B65B 59/001; G06N 20/00; B65G 1/1373; G06Q 10/087
  See application file for complete search history.

(56) References Cited

U.S. PATENT DOCUMENTS

| 10,246,275 | B1 | 4/2019 | Lehmann | |
|---|---|---|---|---|
| 10,332,060 | B2 | 6/2019 | Tian et al. | |
| 11,049,067 | B2 * | 6/2021 | Pandya | G05B 19/41895 |
| 11,138,527 | B2 * | 10/2021 | Zhao | G06Q 10/0832 |
| 11,301,804 | B2 * | 4/2022 | Cui | G06Q 10/0838 |

* cited by examiner

Primary Examiner — Michael I Ezewoko
(74) Attorney, Agent, or Firm — Kilpatrick Townsend & Stockton LLP

(57) ABSTRACT

Techniques for improving packaging systems are described. In an example, a computer system receives item data from a workstation. The item data includes a description of an item. The computer system also receives fit parameters. The fit parameters adjust the fit of items within packaging. The workstation is configured to facilitate packaging of the item. Based at least in part on an input to a packaging decision system, the computer system generates a package decision indicating a package type associated with the packaging of the item. The input is based at least in part on the item data. The packaging decision system is trained based at least in part on packaging data associated with historical item orders. The computer system sends the package decision to the workstation.

20 Claims, 8 Drawing Sheets

PACKAGING RECOMMENDATION SYSTEM

BACKGROUND

Inventory systems, such as those in mail order warehouses and supply chain distribution centers, often utilize complex material handling systems, such as robotic systems and conveyors, to manage, handle, and convey items and/or storage containers in and out of a workspace. On both the in-flow and out-flow of items, an item may be packaged to protect it from damage or conceal the item during shipping.

BRIEF DESCRIPTION OF THE DRAWINGS

Various embodiments in accordance with the present disclosure will be described with reference to the drawings, in which.

Figure 4:
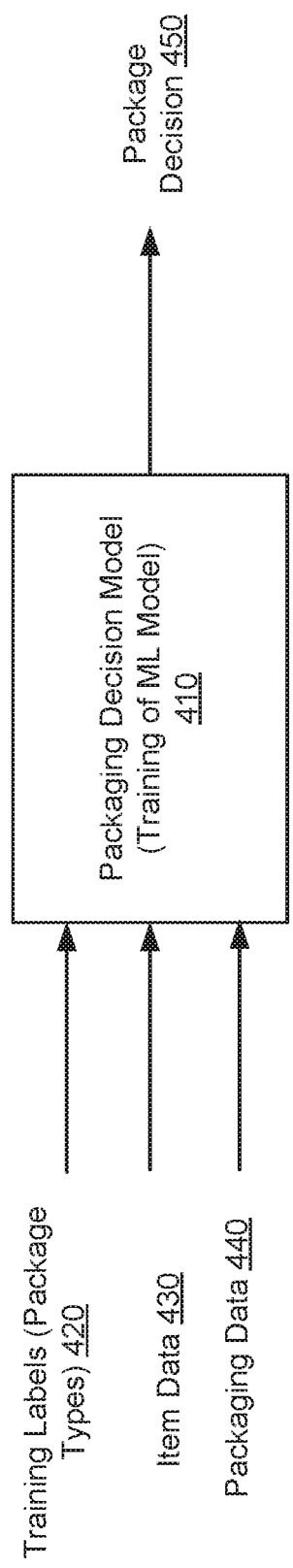
Figure 5:
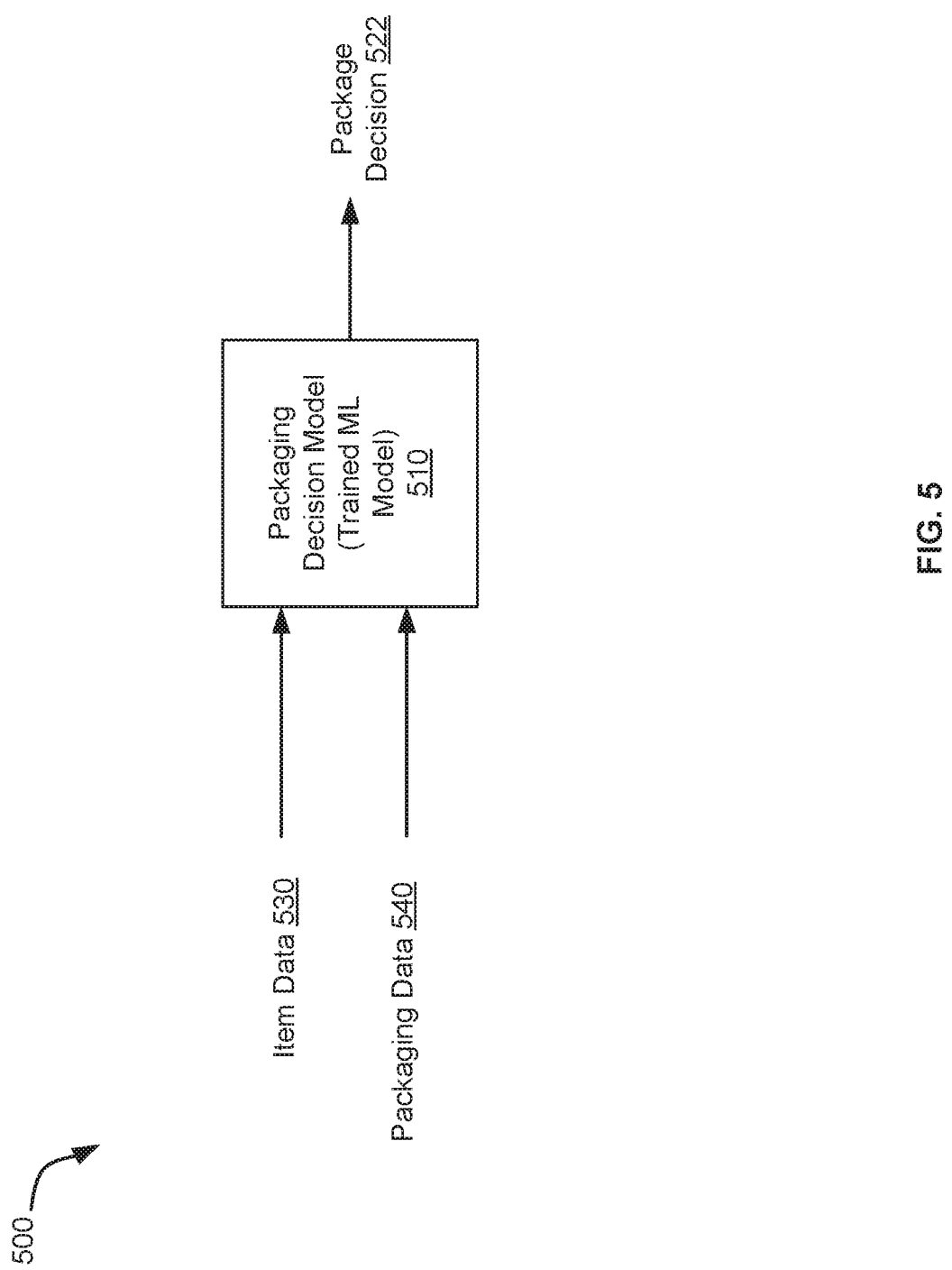
Figure 6:
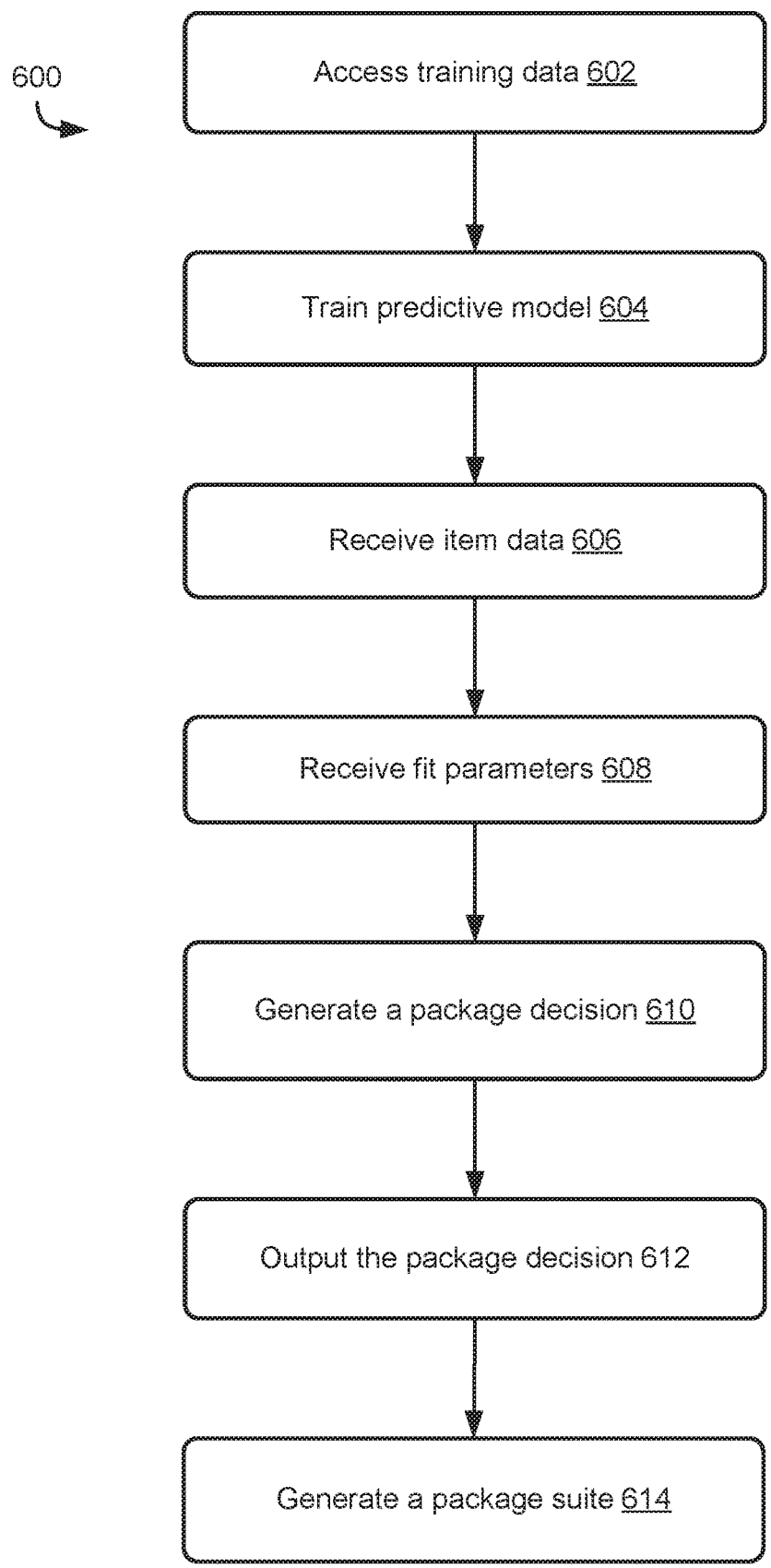
Figure 7:
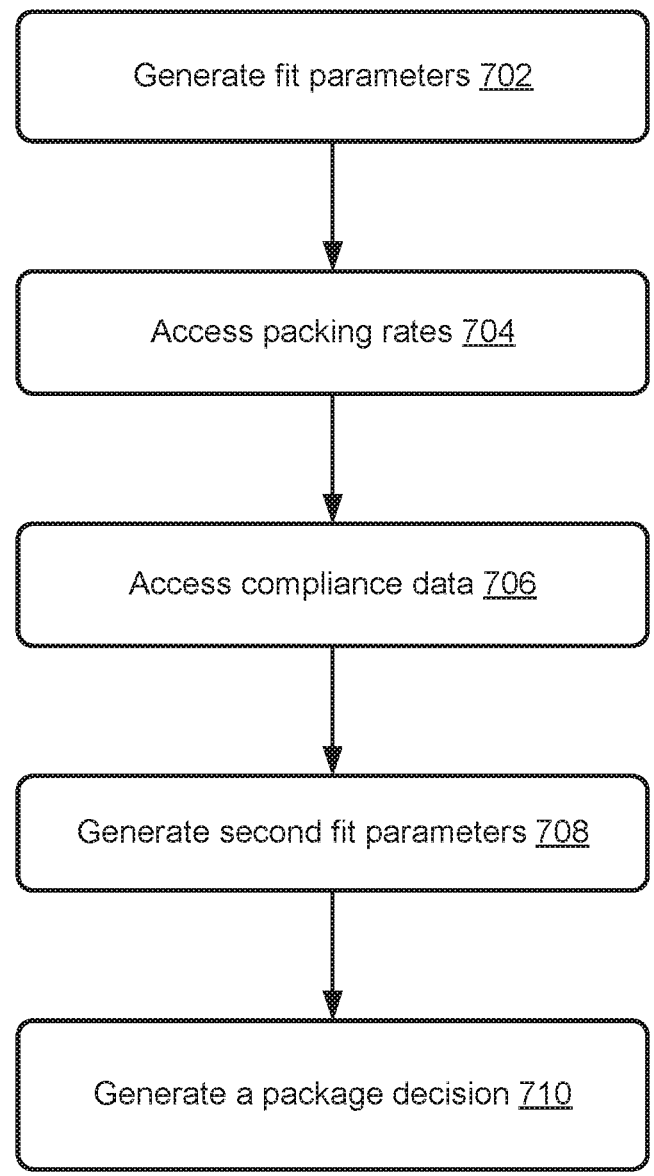
Figure 8:
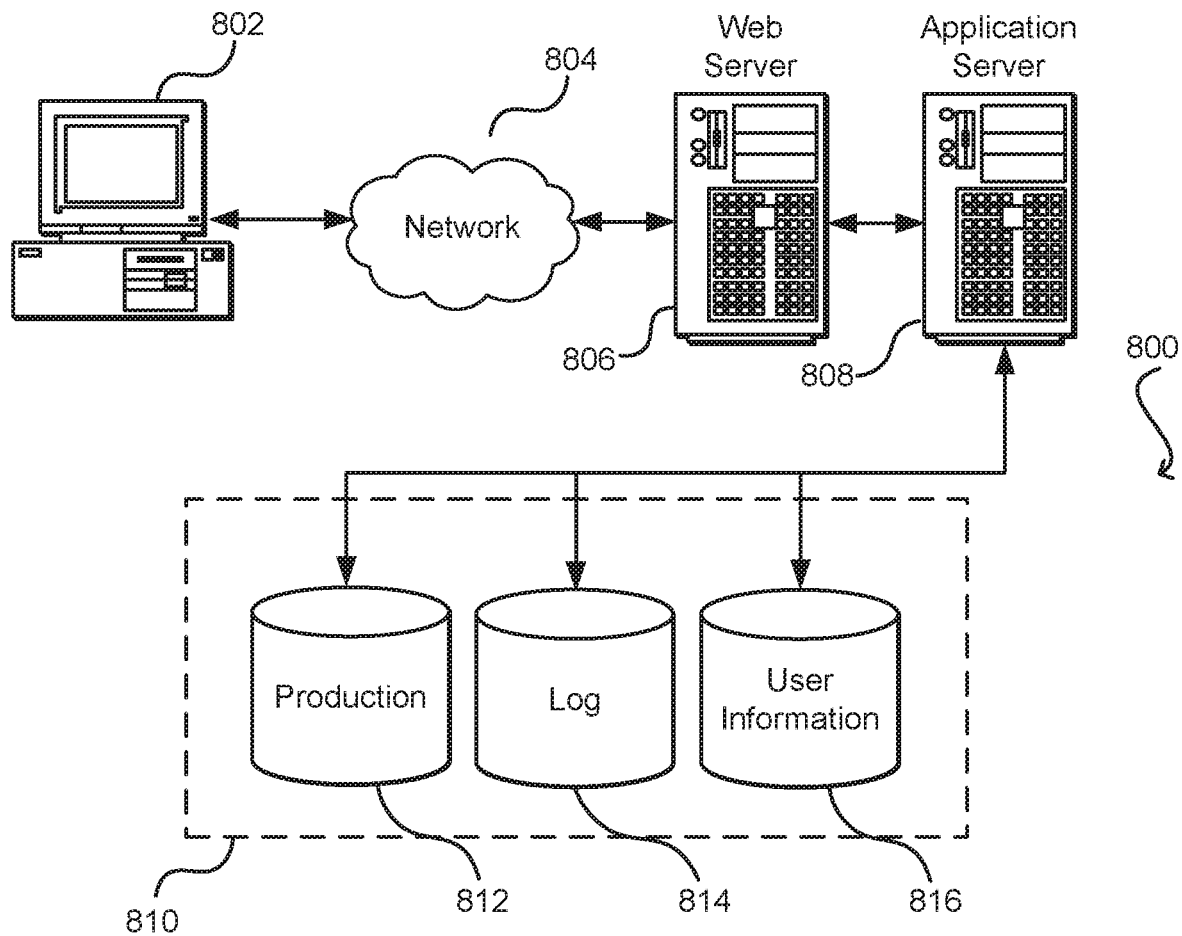

a further example of a computing environment for controlling the packaging of items, according to at least some embodiments;

FIG. 4 illustrates an example of training a packaging decision model, according to at least some embodiments;

FIG. 5 illustrates an example of using a trained packaging decision model, according to at least some embodiments;

FIG. 6 illustrates an example of a flow for controlling the packaging of items, according to at least some embodiments;

FIG. 7 illustrates an example of a flow to generate package decisions with a feedback loop to adjust fit parameters; according to at least some embodiments; and FIG. 8 illustrates an environment in which various embodiments can be implemented.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments of the present disclosure are directed to, among other things, improving the performance of a material handling system. In an example, the material handling system may be configured to handle items, including the packaging and moving of items in and out of a workspace, such as a fulfillment center or a shipping facility. The packaging may include flexible packaging, such as paperboard or flexible mailing pouches or may include boxes and rigid packaging. The material handling system may need to be operable at a particular service level. The material handling system may be measured based at least in part on a packaging rate and a compliance rate. The packaging rate may describe the rate of packaging items by the material handling system. The compliance rate may describe the compliance with packaging recommendations generated by a computing system of the material handling system, the compliance describing whether a packing associate or system complied with the packaging recommendations made by the computing system. The recommendations generated by the computing system determine the packaging type for one or more items (i.e., a paperboard box, flexible mailer, mailing envelope, etc.) as well as a packaging size (i.e., a large box, small box, dimensions of a flexible mailer, etc.). The computing system of the material handling system may fine tune fit parameters for packing items into flexible packaging, the fit parameters describing material property data and construction data associated with packages to define the shape and volume of items that fit within the flexible package, to increase the packaging rate and the compliance rate while also reducing the use of shipping materials. The fit parameters may be incorporated with a generalized algorithm or equation to determine which items fit within a particular size of flexible packaging. The fit parameters are specific to the materials and construction of the flexible packaging. For example, the fit parameters may define the flexibility or compliance of the packaging material as well as the construction of the package, including seam locations and sizes, and these fit parameters may be adjusted to account for packaging items that have relatively large dimensions in three directions but volumetrically fit within the package. The conformity of the packaging may describe the elasticity, flexibility, rigidity, moldability, stretch, and other such properties of flexible packaging. The interior volume of the flexible packaging may conform to the shape of the items as they are packed. With such items, the fit within the package may be tight and difficult to enclose the items in the package, thereby reducing the packaging rate. The fit parameters may be tuned to account for additional flexibility around packaging items by increasing a bounding box of the items when determining a package size or by otherwise accounting for the size and shape of items while packaging.

To improve the packaging rate and the compliance rate, and thus improve the performance of the material handling system, embodiments of the present disclosure involve use of a packaging decision system. In particular, the packaging decision system may represent a computing resource hosting an algorithm for outputting package decisions as packaging recommendations indicating a type of package and a size of package to use for one or more items. In some examples, the packaging decision system may include a machine learning model trained to output the package decision. The machine learning model is trained with previous packaging data describing package decisions for items. The machine learning model receives inputs of item data and fit parameters and outputs a package decision for the items associated with the item data.

To illustrate, consider an example of several items shipped from a material handling system of a fulfillment center. The size and properties (i.e., volume, flexibility, rigidity) of the several items may be known based at least in part on an item description. A database stores material properties and construction data describing various package types, such as various flexible packaging types, available for use. The material properties and construction data are used to generate fit parameters describing the fit of items into various package types. The machine learning model receives the fit parameters as well as the item data and generates a packaging decision. The machine learning model is trained with previous packaging data to minimize the use of excess packaging material in packaging the items. Feedback is then gathered from a fulfillment center describing the packaging rate and the compliance with packaging decisions. The fit parameters are tuned, for example by increasing the fit parameters when the packaging rate has decreased. A decrease in the packaging rate indicating that the fit of the items defined by the fit parameters is too tight and presents difficulties in quickly packaging items. This system produces packaging decisions that minimize the use of packaging material, saving on material and shipping costs, while also maintaining speed and ease of packaging items for shipment, saving on labor costs. In some examples, the packaging rate used to adjust or tune the fit parameters may be based on packaging rates of more experienced or trusted associates.

In the interest of clarity of explanation, embodiments of the present disclosure are described in connection with packaging an item at a fulfillment center for shipment to a destination. However, the embodiments are not limited as such and similarly apply to packaging items for any purpose, such as for moving an item between two locations regardless of the type of these locations, and/or for storing an item.

Figure 1:
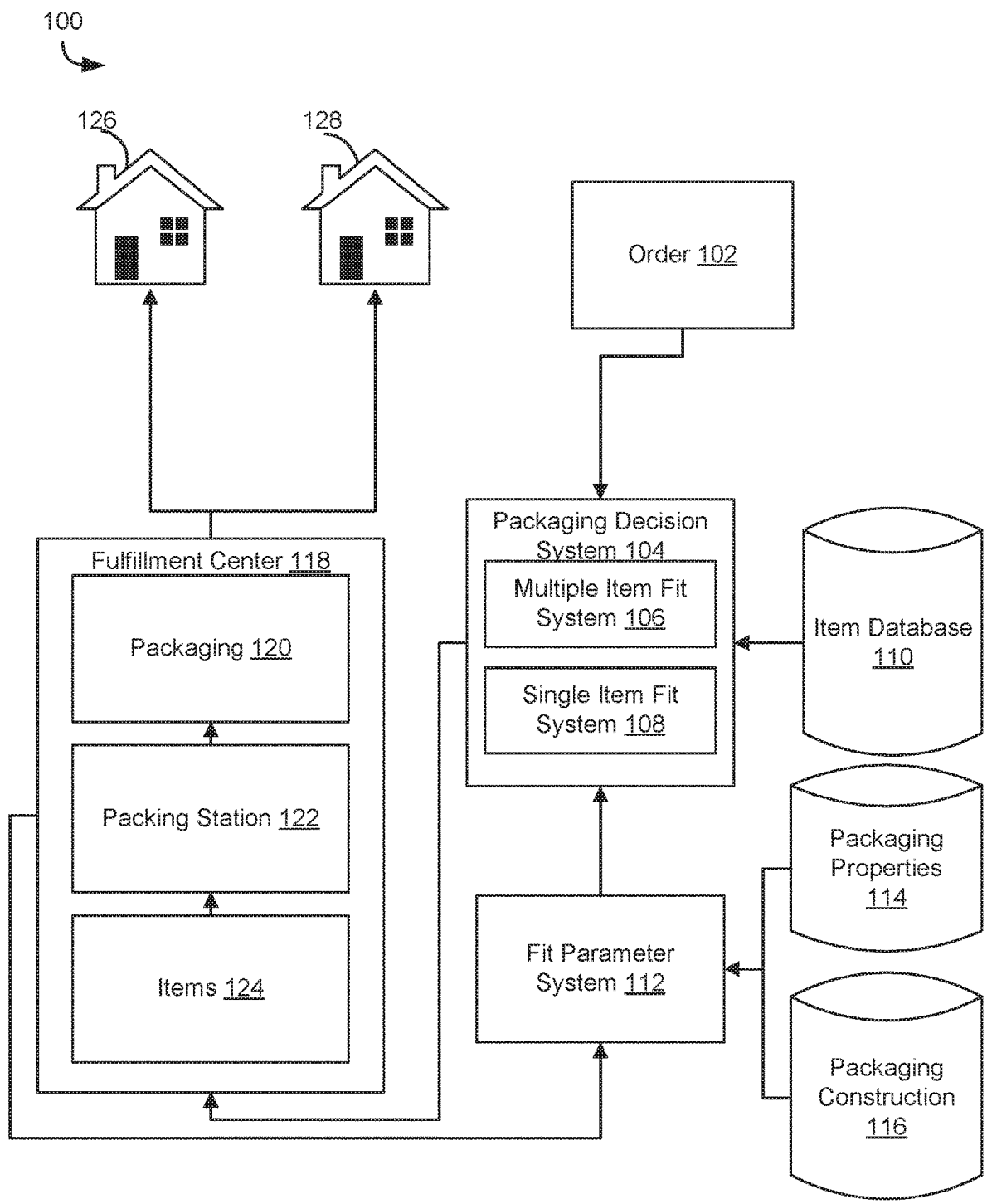
FIG. 1 illustrates a system for controlling the packaging of items, according to at least some embodiments.

FIG. 1 illustrates a system 100 for controlling the packaging of items, according to at least some embodiments. The system 100 includes several elements including a flexible packaging decision system 104, a fit parameter system 112, and a fulfillment center 118. The system 100 receives orders from customers and processes the order through the fulfillment center 118 to deliver items of the order to the users who placed the order. The system 100 recommends package types based at least in part on the items within the order to increase the speed of packaging and reduce use of packaging materials for shipping the items of the orders.

The system 100 is configured to receive orders 102 from a user. The system 100 may include one or more computing devices or computing systems including distributed computing systems as well as networks to perform various operations. The order 102 may be placed over the internet, through a kiosk, over the phone, or by any other means. The order 102 includes one or more identifiers of one or more items that may be at a fulfillment center such as the fulfillment center 118.

The order 102 is received by a flexible or structural decision system 130 that determines whether flexible packaging or rigid (such as a paperboard box) packaging is appropriate for shipping the items of the order 102. The flexible or structural decision system 130 is able to make the determination based on item data from the item database 110 including the dimensions and properties of the items. The item database 110 may include data regarding whether each item is volumetric, rigid, flexible, or about the material properties and dimensions of the items. The flexible or structural decision system 130 then passes the order 102 to a flexible packaging decision system 104 when flexible packaging is recommended and to a structural packaging decision system 132 when a structural packaging is recommended. The decision may be made based on whether the items in the order are fragile and require protection, as well as in a manner to reduce the amount of shipping material and excess weight to be shipped with the items in the order 102.

The system 100 includes a flexible packaging decision system 104 to output package decisions to a workstation for packaging the one or more items of the order 102. The flexible packaging decision system 104 may be implemented on one or more computing devices configured to receive the order 102 as well as information about the items within the order 102 from an item database 110. The flexible packaging decision system 104 also receives information from a fit parameter system 112. The fit parameter system 112 tunes fit parameters of package types to adjust the package decisions recommended by the flexible packaging decision system 104, for example by increasing a bounding box of an item to ensure adequate space within the package for packaging the item. The flexible packaging decision system 104 makes recommendations, referred to as package decisions identifying package types and sizes to fit the items of the order based at least in part on properties of the items as well as fit parameters.

The item database 110 includes data about a number of items which may be included in the order 102. The item data may include the size of the item, the dimensions of the item, the flexibility of the item, the compressibility of the item, and other item data describing physical properties of the items. The item data may include any or a combination of item data about an item, fulfillment data for fulfilling an order for the item requested by a customer, customer data of the customer, and/or condition data about the fulfillment and/or the customer The flexible packaging decision system 104 includes a multiple item fit system 106 and a single item fit system 108. The single item fit system 108 may receive item data from the item database 110 based at least in part on an item within the order 102. The single item fit system 108 then generates a package decision for the single item to fit the single item within the smallest package type possible based at least in part on the fit parameters, including the materials forming the package, the construction details of the package, and additional tuning parameters. The multiple item fit system 106 receives item data for each of the items in the order 102 and determines a package decision based at least in part on fitting the items together into the smallest package possible based at least in part on the parameters described above with respect to the fit parameters.

In an example, the single item fit system 108 receives item information associated with a single item in an order. The order may include only a single item or may include multiple items that will be shipped separately or individually. The item information may include the item data or may provide an identifier that the single item fit system 108 can use to access the item data for the item in the order 102. The single item fit system 108 then determines an overall size and shape of the item, for example by defining a bounding box containing the item based at least in part on the item data. The item data may also define properties of the item such as whether the item is a volumetric item, a rigid item, a flexible item, compressible, and other such properties. The single item fit system 108 then uses the bounding box of the item in combination with the fit parameters to determine a package for use in packaging the single item. The package selected will minimize the use of packaging material to pack the single items while still allowing fast and easy packaging of the item into the package. The package may be a package selected from a suite of available packages or may be a customizable size or shape of packaging.

In an example, the multiple item fit system 106 receives item information associated with items in an order. The item information may include the item data or may provide an identifier that the multiple item fit system 106 can use to access the item data for the items in the order 102. The multiple item fit system 106 then determines an overall size and shape of each item, for example by defining a bounding box containing the item based at least in part on the item data. The item data may also define properties of the item such as whether the item is a volumetric item, a rigid item, a flexible item, compressible, and other such properties. The multiple item fit system 106 then determines an arrangement of the multiple items within the order 102. The arrangement of the multiple items minimizes the volume of a bounding box that encloses all of the multiple items together. The multiple item fit system 106 then uses the arrangement of the multiple items and the size of the overall bounding box in combination with the fit parameters to determine a package for use in packaging the multiple items. The package selected will minimize the use of packaging material to pack the multiple items while still allowing fast and easy packaging of the items into the package. The package may be a package selected from a suite of available packages or may be a customizable size or shape of packaging.

The flexible packaging decision system 104 receives tuning parameters from the fit parameter system 112. The tuning parameters describe the fit and construction of the various package types. For example, the tuning parameter include data describing the properties of the material (material properties) forming each package type as well as the construction details of the package type including the dimensions, locations of seams, and other such construction details. The tuning parameters are associated with how the packaging conforms to the shape of items placed therein. For example, the tuning parameters may be associated with the elasticity, rigidity, flexibility, moldability, and stretchiness of the flexible packaging. The tuning parameters allow the fit parameter system 112 to define how large an interior volume of a particular package type is, the shape of an item the particular package type can receive, and how the item may be inserted into the particular package type. The tuning parameters may be adjusted, for example by decreasing the parameters defining the interior volume of the package type to ensure that items placed within the package fit easily into the interior volume. The fit parameter system 112 receives packaging properties 114 from a database and packaging construction 116 from the same or a different database. The packaging properties 114 and the packaging construction 116 may include the material properties and construction details. The fit parameter system 112 also receives information from the fulfillment center 118 and can adjust the tuning parameters to increase the ease of packaging. This allows the fit parameter system 112 to balance the minimization of packaging material against the speed and ease of packaging items for shipment to find an optimal package decision that minimizes excess packaging while also maintaining ease of packaging.

The fit parameter system 112 accesses packaging rates and compliance data from the fulfillment center 118. The packaging rates describe the rate of packaging items for shipment. The compliance data describes compliance with package decisions output by the flexible packaging decision system 104. When the packaging rate is lower than expected, or in some cases to increase packaging rates, the fit parameter system 112 adjusts the fit parameters for some or all of the package types. This adjustment may include relaxing the interior volume of the package, adjusting material thickness, adjusting the opening size of the packaging, and other such adjustment. The adjusted fit parameters are then received at the flexible packaging decision system 104. After the fit parameters are adjusted, if the packaging rate increases then the fit parameters may be maintained while the fit parameters may be further adjusted if the packaging rates remain unchanged or change insufficiently to reach a desired packaging rate.

The packaging rate may be weighted or adjusted based on a level of experience of particular packing personnel. The packaging rate may further include a trust score associated with a trust of the packaging rate of the associated workstation or personnel. The packaging rate may be trusted with greater confidence when the experience of the personnel operating the workstation is higher. For example, packaging rates for newly hired personnel may not be representative of overall packaging rates and may skew or distort the packaging rate. In some examples, the packaging rate may be measured or determined either based solely on packaging rates of more experienced personnel or may be weighted to favor data gathered regarding packaging rates for experienced personnel. In some examples, trusted personnel or workstations may be used to establish packaging rates, the trusted personnel selected based on experience, consistency, or other such factors.

The flexible packaging decision system 104 includes a computing resource hosting a machine learning (ML) model. In some examples, the ML model may be a single ML model trained to receive both single item and multiple item inputs to perform the functions of the single item fit system 108 and the multiple item fit system 106. In some examples, the flexible packaging decision system 104 may include multiple ML models, for example with a first ML model trained to perform the function of the single item fit system 108 and a second ML model trained to perform the function of the multiple item fit system 106. The ML model is trained to output a package decision indicating a type of package and a package size to use for one or more items. The training may rely on known packaging data such as the material properties and construction data described above as well a plurality of items, where these items may be organized in groups according to common attributes affecting the packaging (e.g., shape, weight, fragility, etc.) and differing by attributes that do not affect the packaging (e.g., color). Additional data may include the packaging rate data and the compliance rate data. The packaging rate data and the compliance rate data may be collected over time based at least in part on actual packaging and delivery of items to end users and/or based at least in part on simulations. Such packaging rate and compliance data may be used as training labels in a supervised training process of the ML model. Once trained, the ML model can be deployed to output the package decision. In particular, in operation, inputs to the ML model may include an item identifier or item data for one or more items and identifiers of package types available to package the item, where the package types correspond to the types used in the training as well as fit parameters describing the fit of items into the package types based at least in part on the material and construction details of the package types, whereby the ML model may output the package type to use for the item.

The system 100 includes the fulfillment center 118 which may include a warehouse or fulfillment center configured to package and deliver items ordered by customers. The fulfillment center 118 receives items 124 which may be stored at the fulfillment center 118. The items 124 are routed to a packaging station 122 where they are placed into packaging 120 having package types according to packaging decisions generated by the flexible packaging decision system 104. The items 124 may then be routed to customers 126 through various shipping means after packaging 120.

In some examples, the flexible packaging decision system 104 may be implemented on a remote computing device and configured to determine a packaging suite for use by the fulfillment center 118. For example, the flexible packaging decision system 104 may receive the inputs described above. The flexible packaging decision system 104 may then generate a recommendation for a suite of packages to equip a fulfillment center with. The suite of packages may include a predetermined set of packaging options, such as varying sizes and construction method to accommodate the most common shipment scenarios. In this manner, the flexible packaging decision system 104 may enable a fulfillment center 118 to select a suite of packaging that will be provided by a supplier to meet the needs of the fulfillment center without the need for individual package customization and minimizing waste of packaging.

Figure 2:
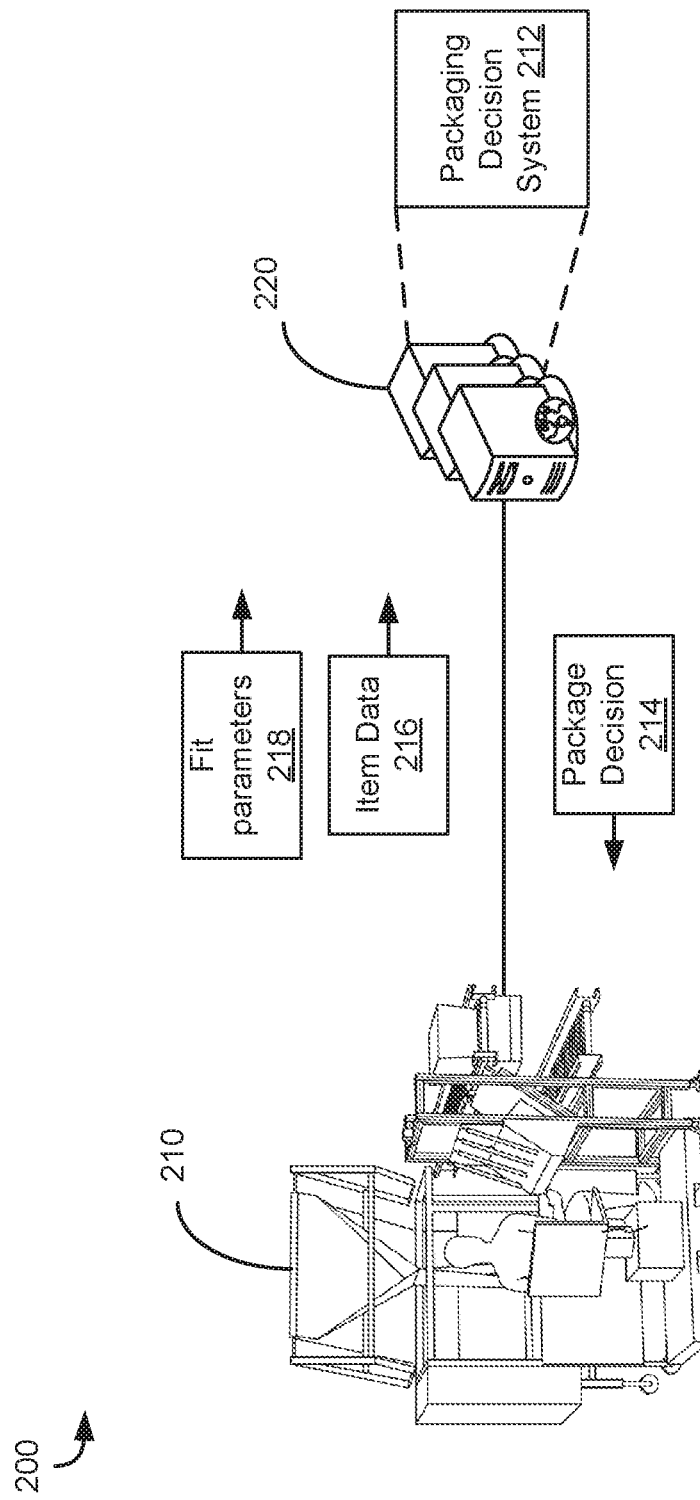
FIG. 2 illustrates an example of a computing environment for controlling packaging of items, according to at least some embodiments.

FIG. 2 illustrates an example of a computing environment 200 for controlling the packaging of items, according to at least one embodiment. As illustrated, the computing environment 200 includes a computer system 220 and a workstation 210. Items may be packaged at the workstation 210 based at least in part on package decisions that are output of the computer system 220.

In an example, the computer system 220 may include, among other components, a packaging decision system 212. The packaging decision system 212 may be identical to the flexible packaging decision system 104 of FIG. 1. The packaging decision system 212 can be implemented as a set of hardware resources, such as a set of servers, and/or a set of virtual resources, such as a set of virtual server instances, hosting a set of algorithms and other tools as further described in connection with the next figures. The packaging decision system 212 can be configured to output package decisions 214. A package decision 214 may identify a type of flexible package and a size of the flexible package to use from various package types, such as and only by way of example from a padded mailer, unpadded mailer, original container, package free, where each type may also depend on the material (e.g., paper, plastic, etc.), size (e.g., height, weight, length, volume capacity, etc.), and/or specific padding (e.g., type, amount, location of padding, etc.) used for the package. In some embodiments, the type of package may include construction types of the packages. For example, locations, thicknesses, and overlap of joints and seams may impact the ability to fit items within the package.

The workstation 210 may be a component of a material handling system within a fulfillment center. In an example, the workstation 210 may include a set of computing devices, some of which may be in communication with the computer system 220 over a data network, and a set of tools and spaces for receiving containers of items transported via robots or conveyor belts, retrieving a particular item from the received items, packaging the item, and preparing the package item for shipping (e.g., adding a shipping training label, moving the item to a conveyor belt or a robot, etc.). Such operations of the workstation 210 can be automated via controls of the computing device(s) and/or can be partially manual (e.g., necessitating an operator to, for instance, pick and place an item in a package).

In an example, upon a trigger event associated with one or more items, a computing device of the workstation 210 may send item data 216 about the one or more items to the computer system 220. The trigger event corresponds to input about the one or more items at the workstation 210 and may include a scan of a barcode of the item by a scanner of the workstation 210, a radio frequency (RF) read of an RF identifier (RFID) tag on the item by an RFID reader of the workstation 210, an image of the one or more items captured by an optical sensor of the workstation 210, or user input at an input device of the workstation 210. The item data 216 may include text data describing the item and/or image data from the image of the item. The text data can be determined by the computing devices based at least in part on a query to a database that stores such data. The query can include a unique identifier of the item determined from the barcode scan, RFID read, image, and/or user input.

The fit parameters 218 may be generated by a fit parameter system 220. The fit parameter system 220 may be implemented on a computing device that may include the computer system 220 or may include a separate computing device. The computing device may also convey the fit parameters 218 to the computer system 220 in instances where the fit parameter system 112 is included with a computing device of the workstation 210. In some cases, the data from the workstation 210 may be fed into the computer system 220 which includes the fit parameter system 112. The fit parameters 218 may also be conveyed to a packaging suite optimization system 230 to generate a recommendation for a packaging suite, for example describing a set of flexible packaging or suite or flexible packaging sizes available for a particular fulfillment center based on the fit parameters 218. The packaging suite optimization system may identify critical parameters that may be used to identify and design a packaging suite of flexible packaging materials and sizes for use by a fulfillment center.

In turn, the computer system 220 inputs the item data 216 to the packaging decision system 212. The packaging decision system 212 may output a package decision 214 based at least in part on the item data 216 and this package decision 214 can be sent back to the same or a different computing device of the workstation 210. The package decision 214 may identify the package type for the one or more items. The package type included in the package decision 214 can be used as a control that automates the packaging of the one or more items and/or can be presented at a user interface of the workstation 210 such that the operator of the workstation 210 may package the one or more items accordingly.

In some examples, the computer system 220 may include the fit parameter system 112 of FIG. 1 as well as the packaging decision system 212. The feedback data described in FIG. 1 is input into the fit parameter system 112 and the output of the fit parameter system 112 is input into the packaging decision system 212.

Figure 3:
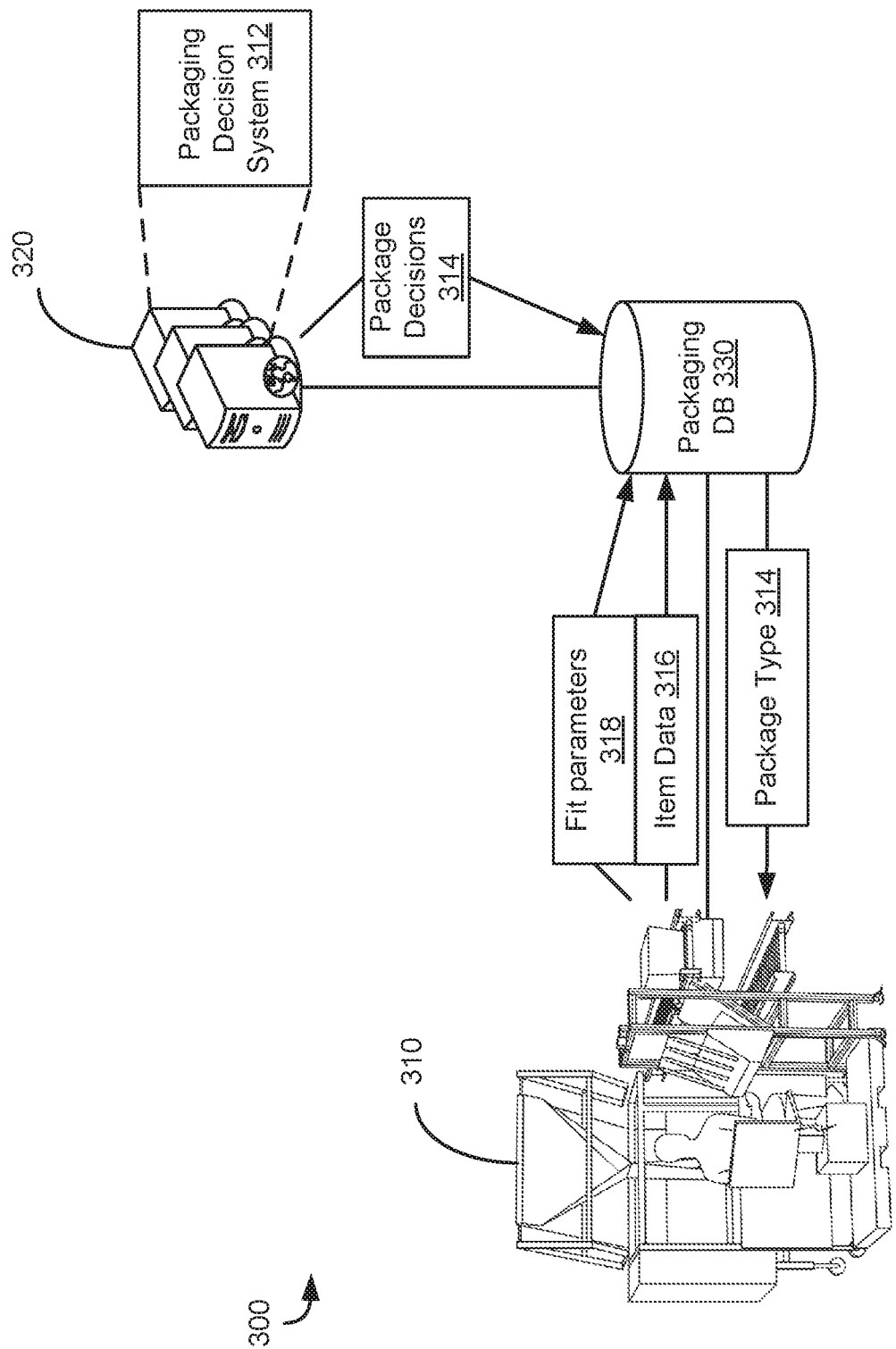
FIG. 3 illustrates another example of a computing environment for controlling packaging of items, according to at least some embodiments.

FIG. 3 illustrates another example of a computing environment 300 for controlling the packaging of one or more items, in accordance with at least one embodiment. The computing environment 300 of FIG. 3 is similar to the computing environment 200 of FIG. 2, except that package decisions 314 may be performed offline for items or item groups.

As illustrated in FIG. 3, the computing environment 300 may include a computer system 320, a workstation 310, and a packaging database 330. Similar to the computer system 220 of FIG. 2, here the computer system 320 may include a packaging decision system 312. The computer system 320 may also include a fit parameter system 320 that generates the fit parameters 318 and may be the same as the fit parameters described above with respect to FIGS. 1 and 2. The fit parameters 318 may be generated by the fit parameter system 320 and output to the packaging decision system 312 for use in generating the package decisions 314. The workstation 310 may also be similar to the workstation 310 of FIG. 2, except that one or more of its computing device(s) may query the packaging database 330.

The packaging database 330 may include a computing system or computing device (not shown) to query the packaging database 330 and provide the package type 314 to the workstation 310, for example while in an offline mode when the packaging decision system 312 is not in communication with the workstation 310. The packaging database 330 is an example of a data store storing package decisions 314. For instance, the packaging database 330 may store an association between an item and a package type for the item.

The packaging database 330 may also store an association between items sizes, shapes, and properties and package types for the item. In an example, the association can be stored as a key-value pair, where the key is a unique identifier of the item and the value is the package type. In another illustration, the packaging database 330 may store an association between a group of items and a package type for the group. In an example, the group may represent a category of items that share common attributes, while also having other attributes that are different and that may not affect the package decision 314. For instance, a television group is a category of electronics that includes televisions available from different manufacturers and having different sizes. The association can be stored as a key-value pair, where the key is a unique identifier of the group and the value is the package type.

In an example, the packaging decision system 312 may be used in an offline mode to populate the packaging database 330. In particular, item data for a plurality of items may be input to the packaging decision system 312 that, in turn outputs package decisions 314. If the items were not logically organized in groups, the package decisions 314 identify the package type per item. If the items were logically organized in groups, the package decisions 314 identify the package type per item. Such package decision 314 are input to the packaging database 330 that may store them as key-value pairs.

The workstation 310 may rely on the packaging database 330 in an online mode. In particular, upon a trigger event associated with an item, similar to the one described in connection with FIG. 2, item data 316 may be used in a query to the packaging database 330. Additionally, the fit parameters 318 may be conveyed to the packaging database and/or the packaging decision system 312. The fit parameters 318 may be similar to and conveyed in a similar manner to the fit parameters 218 of FIG. 2. The fit parameters 318 are conveyed from a memory (not shown) of the workstation 310 or associated with the workstation 310, such as a memory associated with a fulfillment containing one or more workstations 310. A query result may be returned and can identify the package decision 314 to use for the item.

In an example, the packaging database 330 may be stored remotely from the workstation 310. In this example, a computing device of the workstation 310 may submit a query thereto over a data network. In another example, the computing device may store the packaging database 330 (e.g., in local memory or cache).

FIG. 4 illustrates an example of training a packaging decision model 410, in accordance with at least one embodiment. The packaging decision model 410 may be implemented as an ML model, such as a deep neural network, convolutional neural network, recursive neural network, a reinforcement learning model, a regression model, a Bayesian model, or another type of ML model. The packaging decision model 410 may be included as part of the flexible packaging decision system 104, 212, and 312 of FIGS. 1-3. The packaging decision model 410 may include a single ML model or multiple ML models, as described with respect to the flexible packaging decision system 104.

In an example, the training may be supervised. In this example, the training data set may include training labels 420. If unsupervised, no training labels 420 may be needed. In both cases, the training data set item may also include item data 430 describing the properties of the items and/or packaging data 440 describing the properties of the packages.

In an example, a training label 420 may indicate a package type. The package type may be gathered from fulfillment center data or may be simulated. The package type may be historical package types associated with historical item data describing previous items processed through the fulfillment center. If the package type differs from a recommended package type, the training label 420 may include information about the difference and/or the reason for the difference between the recommendation and the selected package type, as indicated by compliance data. For instance, the recommended package type may have been overridden by an operator (e.g., a packer). The training label 420 may include information about the override. The packaged item may be associated with a user order for an item. The package type may be stored as package data. The package data may be collected from a fulfillment center, a workstation where the item may have been packaged and associated with the user order, and/or from any computing node along the fulfillment lane between the fulfillment center and the delivery location (such as from a device of a delivery operator, where the device scans the package and sends the package data).

The historical (or simulated) package type data as training data. For a dataset including an item (or a grouping of items in the case of multi-items packaging), the training data indicates the package type that was used. Additionally, the fit parameters of that package type and the item data for the item (or multiple items). The training data also includes compliance with a recommended package type, and if there was no compliance, the specific recommended package type and the reason for non-compliance. The training data may also include how fast the item(s) was packed. Additionally, an overall compliance rate and packaging rate may be gathered from the fulfillment center For the ML model, the training label as described above may be set as ground truth. The ML model may output, given corresponding item data and fit parameters of possible package types, predicted use cases of the same package types. The loss function will penalize any prediction that is different from the used package type. When the difference between the predicted package type and the actual used package type is large, the penalty is heavier. Also, if the predicted type corresponds to the overridden type, the ML model may impose a heavy penalty. The item data and fit parameters may be variables in the loss function of the ML model. The compliance rate and packaging rate may also be included as optimization parameters within the loss function. During the training process, the ML model iterates through the training data for different items with the goal of minimizing the loss function. Between iterations, backpropagation is used to update the parameters of the ML model (e.g., the weight of the connections between the nodes of the different layers of the ML model).

Item data 430 may include data describing the item, including attributes of the item. The attributes can include the name of the item, description of the item, group of the item, supplier, of the item weight of the item, the volume of the item, the physical properties of the item, the type of supplier's original container of the item, price of the item, and/or any other information about the item available from a catalog about items (where the catalog may be stored in a database), from a network document (e.g., a web page) of the supplier, or from third party network documents about the item.

Packaging data 440 may include data related to packaging material including the packaging material properties and the construction of the packaging. The packaging data 440 may include the tuning parameters of the fit parameter system 112 of FIG. 1. The fit parameters may be used by the ML model to determine and output a package decision 450. The package decision 450 is the same as the package decision 214, 314 of FIGS. 2-3.

The training labels 420, item data 430, and packaging data 440 may be stored in one or more databases and may be associated with each other. For instance, when stored, a training label of an item may be associated with an item identifier (or a group of identifiers) based at least in part on a user order for the item. The item identifier (or the group identifier) may be used to further associate the training label with the item data such as the item properties as well as the packaging material and packaging decision.

The training labels 420 may be used as a control (e.g., ground truth) and the item data 430 and packaging data 440 may be used as variables in the training of the packaging decision model 410. The training may depend on the type of the used ML model. For instance, for a convolutional neural network, the training may minimize a loss function defined as a function of a package decision 450 and the actual package used when the item was packaged. The goal of the loss function is to minimize excess packaging material while increasing the compliance rate and the packaging rate of the items. A backpropagation algorithm may be implemented to iteratively tune the weights of the connections between the nodes of the convolutional network.

FIG. 5 illustrates an example of a packaging decision system 500 for controlling the packaging of items, in accordance with at least one embodiment. The packaging decision system 500 can host a packaging decision model 510, such as a trained ML model, to output a package decision 522. The decision engine 510 itself can output the package decision 522 (e.g., the type of package to use). Upon completion of the training as described in connection with FIG. 4, a packaging decision model 510 (e.g., the trained packaging decision model 410 of FIG. 4) may be used to generate package decisions 522.

In an example, item data 530 and packaging data 540 may be input to the packaging decision model 510. The item data 530 may include any or a combination of item data about an item, fulfillment data for fulfilling an order for the item requested by a customer, customer data of the customer, and/or condition data about the fulfillment and/or the customer. The packaging data 540 may include any or a combination of different package types describing shapes, sizes, materials, construction methods, or other such data related to the packaging. In response, the packaging decision model 510 may output a package decision 522 indicating the package type to use for the item.

FIG. 6 shows an illustrative flow related to using a predictive model to generate a package decision, in accordance with various embodiments. Some or all of instructions for performing the operations of the illustrative flow can be implemented as hardware circuitry and/or stored as computer-readable instructions on a non-transitory computer-readable medium of a computer system, such as any of the computer systems 220 an, 320 of FIGS. 2-3. The predictive model can be trained to output the package decision and can include a trained ML model. As implemented, the instructions represent modules that include circuitry or code executable by a processor(s) of the computer system. The use of such instructions configures the computer system to perform the specific operations described herein. Each circuitry or code in combination with the processor represents a means for performing a respective operation(s). While the operations are illustrated in a particular order, it should be understood that no particular order is necessary and that one or more operations may be omitted, skipped, performed in parallel, and/or reordered.

FIG. 6 illustrates an example of a flow for controlling the packaging of items. As illustrated, the flow may start at operation 602, where the computer system accesses training data. The training data includes any or a combination of training labels, item descriptions, item images, associated with historical orders for items by customers, historical fulfillments of the orders, simulated orders, and/or simulated fulfillments of the simulated orders, or other such data as described with respect to FIG. 4.

At operation 604, the computer system trains the predictive model based at least in part on the training data. For instance, the training of the ML model of the predictive model is supervised and involves using the training labels as ground truth and the other data of the training data as variables. To illustrate, the ML model is implemented as a convolutional neural network having a loss function. The training involves minimizing the loss function given the ground truth and variables to update parameters of the convolutional neural network by using a backpropagation algorithm.

At operation 606, the computer system receives item data associate with an item. In an example, the item data is received from a workstation. The item data is associated with an item associated with an order of a customer for the item. The item data can include any item data, including the item data described above describing the properties, dimensions, and other such features of the item.

At operation 608, the computer system receives fit parameters. The fit parameters may be received from fit parameter system, such as the fit parameter system 112. The fit parameters are generated based at least in part on material properties of the packaging and construction of the packaging. The fit parameters may be adjusted based at least in part on feedback collected from actual fulfillments of orders, such as the packaging rate at the workstation or compliance of the workstation with the packaging decision output by the ML model in historical data. The fit parameters may define the fit of items into packaging, additional volume included within the packaging, and other such features. The fit parameters may be adjusted in response to changes in the packaging rate and compliance data. For example, the fit parameters may be adjusted to increase space around items in packaging when packed to increase the ease of packaging and thereby increase the packaging rate at the fulfillment center.

The fit parameters may be accessed by the computer system and relate to the conformity of the flexible packaging to items placed within the packaging. For example, highly flexible packaging has a high conformity and closely aligns with and follows the shape and contours of the items while packaging with less conformity will not follow the contours of the items as closely. This may impact the interior volume of the package, for example by changing the available interior volume of the packaging after a first item is introduced into the packaging.

At operation 610, the computer system generates a package decision based at least in part on the item data and the fit parameters. The computer system uses the item data and the fit parameters as inputs into the packaging decision system. The packaging decision system may be the flexible packaging decision system 104 of FIG. 1. An output of the packaging decision system includes a package decision indicating the package type. In an example, the ML model outputs the package decision.

At operation 612, the computer system outputs the package decision to the workstation. For instance, a response is sent back to the workstation and the response includes data that identifies the package type that is to be used in the packaging of the item. The workstation, when automated, can package the item in a package corresponding to the package type. Otherwise, the workstation can display the data at a user interface for an operator to package the item in such a package.

In some instances, the computer system may generate a package suite describing a set of packages for use by a fulfillment center. The computer system generate a recommendation for a suite of packages to equip a fulfillment center with. The packaging suite may be generated based on fit parameters from the fit parameter system as well as historical packaging data from the fulfillment center. The suite of packages may include a predetermined set of packaging options, such as varying sizes and construction method to accommodate the most common shipment scenarios. In this manner, the computer system may enable a fulfillment center to select a suite of packaging that will be provided by a supplier to meet the needs of the fulfillment center without the need for individual package customization and minimizing waste of packaging.

FIG. 7 shows an illustrative flow related to generating a package decision with a feedback loop to adjust fit parameters, in accordance with various embodiments. Some or all of instructions for performing the operations of the illustrative flow can be implemented as hardware circuitry and/or stored as computer-readable instructions on a non-transitory computer-readable medium of a computer system, such as a computer system implementing the fit parameter system 112 of FIG. 1. As implemented, the instructions represent modules that include circuitry or code executable by a processor(s) of the computer system. The use of such instructions configures the computer system to perform the specific operations described herein. Each circuitry or code in combination with the processor represents a means for performing a respective operation(s). While the operations are illustrated in a particular order, it should be understood that no particular order is necessary and that one or more operations may be omitted, skipped, performed in parallel, and/or reordered.

FIG. 7 illustrates an example of a flow for adjusting fit parameters and generating package decisions. As illustrated, the flow may start at operation 702, where the computer system generates fit parameters. The fit parameters may be generated by a fit parameter system 112 as described with respect to FIG. 1. The fit parameters may be initially generated based at least in part on material properties and construction data associated with the packages.

At operation 704, the computer system accesses packaging rates associated with a rate of packaging items at a fulfillment center. The packaging rate may include historical packaging rate data related to the rate of packaging items at the fulfillment center.

At operation 706, the computer system accesses compliance data associated with compliance with packaging decisions at the fulfillment center. The compliance data may include compliance with package decisions based at least in part on previous historical data. The historical package decisions may be compared with override data and/or packaging data relating to the packaging used to pack previous items.

At operation 708, the computer system generates second fit parameters based at least in part on the packaging rates and the compliance data. The second fit parameters may be generated by the fit parameter system 112. The fit parameters are generated based at least in part on material properties of the packaging and construction of the packaging. The second fit parameters are adjusted based at least in part on feedback collected from actual fulfillments of orders, such as the packaging rate at the workstation or compliance data described above The fit parameters may define the fit of items into packaging, additional volume included within the packaging, and other such features. The fit parameters may be adjusted in response to changes in the packaging rate and compliance data. For example, the fit parameters may be adjusted to increase space around items in packaging when packed to increase the ease of packaging and thereby increase the packaging rate at the fulfillment center.

At operation 710, the computer system generates a package decision. The computer system uses the item data and the fit parameters as inputs into the packaging decision system. The packaging decision system may be the flexible packaging decision system 104 of FIG. 1. An output of the packaging decision system includes a package decision indicating the package type. In an example, the ML model outputs the package decision.

FIG. 8 illustrates aspects of an example environment 800 for implementing aspects in accordance with various embodiments. As will be appreciated, although a Web-based environment is used for purposes of explanation, different environments may be used, as appropriate, to implement various embodiments. The environment includes an electronic client device 802, which can include any appropriate device operable to send and receive requests, messages, or information over an appropriate network 804 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 806 for receiving requests and serving content in response thereto, although for other networks an alternative device serving a similar purpose could be used as would be apparent to one of ordinary skill in the art.

The illustrative environment includes at least one application server 808 and a data store 810. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio, and/or video to be transferred to the user, which may be served to the user by the Web server in the form of HyperText Markup Language ("HTML"), Extensible Markup Language ("XML"), or another appropriate structured language in this example. The handling of all requests and responses, as well as the delivery of content between the client device 802 and the application server 808, can be handled by the Web server. It should be understood that the Web and application servers are not required and are merely example components, as structured code discussed herein can be executed on any appropriate device or host machine as discussed elsewhere herein.

The data store 810 can include several separate data tables, databases or other data storage mechanisms and media for storing data relating to a particular aspect. For example, the data store illustrated includes mechanisms for storing production data 812 and user information 816, which can be used to serve content for the production side. The data store also is shown to include a mechanism for storing log data 814, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 810. The data store 810 is operable, through logic associated therewith, to receive instructions from the application server 808 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the client device 802. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 8. Thus, the depiction of the environment 800 in FIG. 8 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGP") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C#, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based at least in part on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A system comprising:
a workstation located in a fulfillment center and configured to facilitate packaging of an item available from the fulfillment center in one of a plurality of available packages, each of the plurality of available packages corresponding to a different package type; and
a computer system comprising one or more processors and one or more memories, the one or more memories storing code of a machine learning model and computer-readable instructions that, upon execution by the one or more processors, configure the computer system to:
train, based at least in part on historical packaging data associated with packaging previous items, a machine learning model by at least reducing a loss function having penalization parameters associated with package types of the previous items;
receive item data comprising a description of the item;
receive fit parameters comprising a description of the plurality of available packages and describing an ability of the plurality of available packages to conform to the shape of the item;
generate, by at least inputting the item data and fit parameters to the machine learning model, a package decision indicating a package type of the plurality of available packages for the item;

output, to the workstation, the package decision, the item being packaged at the workstation in a package corresponding to the package type indicated by the package decision;

access packaging rate data and compliance data indicating a speed of packaging the item at the workstation and a compliance with the package decision;

generate second fit parameters based at least in part on the packaging rate data and compliance data; and generate, by at least inputting the item data and the second fit parameters to the machine learning model, a second package decision.

2. The system of claim 1, wherein the item data comprises a description of more than one item, and wherein the package decision is further based at least in part on the description of more than one item being used to generate a bounding box for each of the more than one item and determining the package decision based at least in part on the bounding box of each of the more than one item.

3. The system of claim 1, wherein the one or more memories store further computer-readable instructions that, upon execution by the one or more processors, configure the computer system to generate a package recommendation dataset describing a suite of packages for the plurality of available packages based at least in part on the fit parameters.

4. A method implemented by a computer system, the method comprising:

training, based at least in part on historical packaging data associated with packaging previous items, a machine learning model by at least reducing a loss function having penalization parameters associated with a package type of the historical packaging data;

receiving item data comprising a description of the item;

accessing stored fit parameters, the stored fit parameters comprising a description of a plurality of available packages and describing an ability of the plurality of available packages to conform to the shape of the item;

generating, based at least in part on the machine learning model, a package decision indicating a package type for packaging the item, the package decision based at least in part on the item data and the fit parameters;

outputting the package decision to a workstation configured to facilitate packaging of the item;

accessing packaging rate data and compliance data indicating a speed of packaging the item at the workstation and a compliance with the package decision;

generating second fit parameters based at least in part on the packaging rate data and compliance data; and generating, by at least inputting the item data and the second fit parameters to the machine learning model, a second package decision.

5. The method of claim 4, further comprising generating the stored fit parameters based at least in part on the packaging rate data and the compliance rate data.

6. The method of claim 5, wherein generating the stored fit parameters comprises increasing interior package volume requirements in response to a decrease in the packaging rate.

7. The method of claim 5, wherein generating the stored fit parameters comprises increasing interior package volume requirements in response to a decrease in the compliance rate.

8. The method of claim 4, further comprising generating the stored fit parameters based at least in part on material data describing a material forming the package.

9. The method of claim 4, further comprising generating the stored fit parameters based at least in part on construction details of the package.

10. The method of claim 4, wherein receiving the item data comprises receiving an indication of the item as a rigid item, a foldable item, or a volumetric item.

11. The method of claim 4, wherein generating the second fit parameters comprises increasing interior package volume requirements in response to a decrease in the packaging rate.

12. The method of claim 4, further comprising generating the second fit parameters based at least in part on material data describing a material forming the package.

13. The method of claim 4, further comprising generating the second fit parameters based at least in part on construction details of the package.

14. One or more non-transitory computer readable media storing instructions, that upon execution on a computer system, cause the computer system to perform operations comprising:

training, based at least in part on historical packaging data associated with packaging previous items, a machine learning model by at least reducing a loss function having penalization parameters associated with a package type of the historical packaging data;

receiving item data comprising a description of the item;

accessing stored fit parameters, the stored fit parameters comprising a description of a plurality of available packages and describing an ability of the plurality of available packages to conform to the shape of the item;

generating, based at least in part on the machine learning model, a package decision indicating a package type for packaging the item, the package decision based at least in part on the item data and the fit parameters;

outputting the package decision to a workstation configured to facilitate packaging of the item;

accessing packaging rate data and compliance data indicating a speed of packaging the item at the workstation and a compliance with the package decision;

generating second fit parameters based at least in part on the packaging rate data and compliance data; and generating, by at least inputting the item data and the second fit parameters to the machine learning model, a second package decision.

15. The one or more non-transitory computer readable media of claim 14, further storing first additional instructions that upon execution on the computer system, cause the computer system to perform first additional operations comprising wherein generating the package decision is further based at least in part on the packaging rate data and the compliance data.

16. The one or more non-transitory computer readable media of claim 14, wherein the machine learning model is further trained based at least in part on the packaging rate data and the compliance data.

17. The one or more non-transitory computer readable media of claim 14, wherein generating the package decision is performed by a remote computing device and the package decision is stored in a database of the workstation, and wherein generating the package decision further comprises querying the database for the package decision.

18. The one or more non-transitory computer readable media of claim 14, wherein generating the second fit parameters comprises increasing the stored fit parameters in response to a decrease in the packaging rate or the compliance data.

19. The one or more non-transitory computer readable media of claim 14, wherein the computer system is a computing component of the workstation.

20. The one or more non-transitory computer readable media of claim 14, wherein the item data is received based at least in part on a scan of the item at the workstation or user input at the workstation indicating that the item is to be packaged, and wherein the package decision is sent to the workstation prior to the packaging of the item at the workstation.

* * * * *